3,560,419
LIGHT STABILIZED ANTISTATIC POLYAMIDES
Lawrence W. Crovatt, Jr., Gulf Breeze, and Oscar A. Pickett, Jr., Pensacola, Fla., assignors to Monsanto Company, St. Louis, Mo., a corporation of Delaware
No Drawing. Filed Jan. 10, 1969, Ser. No. 790,439
Int. Cl. C08g 51/54; C08k 1/66
U.S. Cl. 260—18                        4 Claims

ABSTRACT OF THE DISCLOSURE

Tensile strength loss on exposure to light is reduced, in polycarbonamides containing between 0.1 and 20.0 weight percent polyalkoxylated triglyceride of a fatty acid containing from 10 to 30 carbon atoms, by adding from 0.005 to 4.0 weight percent of a trialkyl ($C_6$ to $C_{18}$) phosphine oxide.

---

The invention relates to an additive for a polycarbonamide composition having antistatic and antisoil properties, wherein the additive reduces loss of strength upon exposure to light.

U.S. Pat. No. 3,388,104 to Crovatt discloses and claims polycarbonamides having greatly improved permanent antistatic properties, produced by incorporating into the molten polymer prior to filament formation from 0.1 to 20.0 weight percent of a polyalkoxylated triglyceride of a saturated fatty acid having from 10 to 30 carbon atoms. The disclosure of the above noted patent is incorporated herein by reference. Unfortunately, the resulting antistatic filaments tend to lose tensile strength on exposure to light. It has been discovered that this loss in tensile strength can be reduced by the further addition of trialkyl phosphine oxides as more fully set forth below.

Accordingly, a primary object of the invention is to provide additives for reducing strength loss upon exposure to light in polycarbonamides containing polyalkoxylated triglycerides. A further object is to provide methods for incorporating such additives into filaments, and to provide for such filaments which retain a greater proportion of their original tensile strength after exposure to light.

Other objects of the invention will in part be obvious and will in part appear hereinafter.

The objects of the invention are achieved by blending the trialkyl phosphine oxide, polymer, and triglyceride prior to filament formation, i.e., prior to melt spinning. As more fully set forth in the above noted patent, the polymeric substances with which this invention is concerned are synthetic high molecular weight fiber-forming polycarbonamides of the general type characterized by the presence of recurring carbonamide groups as an integral part of the polymer chain, and wherein such groups are separated by at least two carbon atoms. They are further characterized by high melting point, pronounced crystallinity and insolubility in most solvents except mineral acids, formic acid and phenols. Upon hydrolysis with strong mineral acids the polymers revert to the reactants from which they were formed.

The polyamides of this type are usually made by heating either (a) substantially equimolecular proportions of a diamine and dicarboxylic acid or (b) various amino acids and amide-forming derivatives thereof until the material has polymerized to the fiber-forming stage, which stage is not generally reached until the polyamide has an intrinsic viscosity of at least 0.4, the intrinsic viscosity being defined as:

$$\lim_{C \to 0} \left( \frac{\text{Log}_e \eta_r}{C} \right)$$

in which $\eta_r$ is the relative viscosity of a dilute solution of the polymer in m-cresol in the same units and at the same temperature and C is the concentration in grams of polymer per 100 cc. of solution. The polymers thus obtained have high melting points and can be cold drawn to form strong highly oriented fibers.

The diamines, dicarboxylic acids and amide-forming derivatives thereof which can be used as reactants to yield the fiber-forming polyamides are well known in the art. Suitable diamines may be represented by the general formula $$NH_2(CH_2)_nNH_2$$

in which n is an integer of two or greater, preferably from 2 to 10. Representative examples are ethylene diamine, propylene diamine, tetramethylene diamine, pentylmethylene diamine, hexamethylene diamine, octamethylene diamine, and decamethylene diamine. Suitable dicarboxylic acid reactants are represented by the general formula:

$$HOOCRCOOH$$

in which R is a divalent hydrocarbon radical having a chain length of at least two carbon atoms. These dicarboxylic acids may be illustrated by sebacic acid, octadecanedioic acid, adipic acid, suberic acid, azelaic acid, undecanedioic acid, glutaric acid, pimelic acid, brassylic acid, and tetradecanedioic acid.

In place of the above-noted dicarboxylic acids and diamines the amide-forming derivatives thereof can be employed to form fiber-forming polymers. Amide-forming derivatives of the diamines include the carbamates and N-formyl derivative. Amide-forming derivatives of the dibasic carboxylic acids comprise the mono- and di-ester, the anhydride, and mono- and diamide, and the acid halide.

In addition to the above diamines and dicarboxylic acids and their derivatives, the polyamides of this invention may be prepared from certain of the amino acids. The amino acids are represented by the general formula:

$$H_2N(CH_2)_nCOOH$$

in which n is an integer of four or more and preferably from 4 to 11. Illustrative examples of these amino acids are 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid, and 22-aminobehenic acid. Also the lactams of these amide acids may be used as monomers from which the polyamides of the present invention may be prepared.

In addition to the homopolyamides, copolyamides and terpolyamides are also contemplated and are within the scope of this invention. The copolyamides and terpolyamides are obtained in known manner. That is, mixtures of diamines and dibasic acids are used in forming the co- and ter-polymers, with the diamine being present in substantially equimolar proportions to the total dibasic acids present during the polymer-forming reaction. The co- and ter-polymeric products may be formed directly from the corresponding monomers, or one or more homo-polymers may be added to the polymerizable reactants, distribution of the desired units entering the products via amide interchange. Formation of the desired diamine salts of the various dibasic acids prior to melt polymerization assist in control of the reaction. The conventional polyamide melt polymerization cycle is suitable.

To the polycarbonamide is added (as the anistatic agent) from 0.1 to about 20.0 weight percent, based on the weight of said polycarbonamide, of a polyalkoxylated triglyceride of a saturated fatty acid having 12 to 30 carbon atoms. These triglycerides may be represented by the formula:

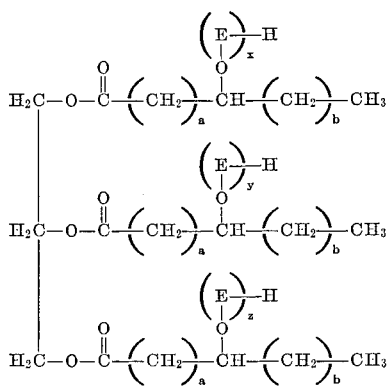

wherein $a$ and $b$ are integers from 2 to 26 with the proviso that the sum of $a+b$ is at least 10. E is an alkyleneoxy radical containing 2 to 5 carbon atoms, and $x$, $y$ and $z$ are integers greater than zero and wherein the sum of $x+y+z$ is equal to a value of between 50 and 500. The polyoxyalkylene portion of the glyceride, i.e., $(E)_x$, $(E)_y$ and $(E)_z$ should be in the molecular weight range between 2,000 and 22,000 and may be ethoxy, propoxy, butoxy, or pentoxy. The long chain saturated fatty acids of the triglyceride may have from 12 to about 30 carbon atoms, with 12 to 25 being preferred. A preferable concentration of the modifying agent to be used is from 1.0 to 15.0 weight percent.

The polyalkoxylated triglyceride may be added to the polymer-forming reactants at the initial state of the polymerization or during the course of the polymerization. It is preferably dispersed into the polymer melt just prior to extrusion into filaments, although it may be mixed with polymer flake prior to the melt spinning of the flake.

The long chain saturated fatty acids in the triglyceride may contain from 12 up to about 30 carbon atoms, with 12 to 25 being preferred. Examples of suitable acids are the hydroxy derivatives of lauric acid, myristic acid, palmitic acid, stearic acid, behenic acid, cerotic acid, and the like. The hydroxy derivatives of these saturated fatty acids are easily produced by hydroxylating the corresponding unsaturated fatty acid by known methods. If necessary after hydroxylation, any remaining double bonds may be removed by hydrogenation, for example with hydrogen gas. It is important that the triglyceride be free from carbon to carbon unsaturation. The reason for this is that the unsaturated fatty acid portion is subject to degradation under the conditions to which polyamide fibers are normally subjected.

A preferred antistatic agent in accordance with this invention is the ethoxylated triglyceride of hydroxy stearic acid. One reason for the preference of this compound is that it is readily available as a derivative of castor oil. Castor oil is known to consist of about 88 percent of the glyceride ester of ricinoleic acid, which may be represented by the following formula:

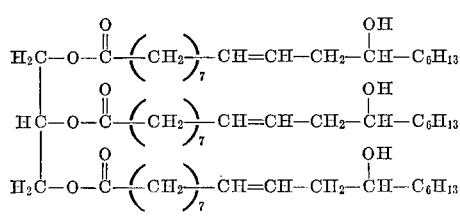

When the preceding glyceryl tririconoleate is polyethoxylated by known methods, it yields a compound of the following structure:

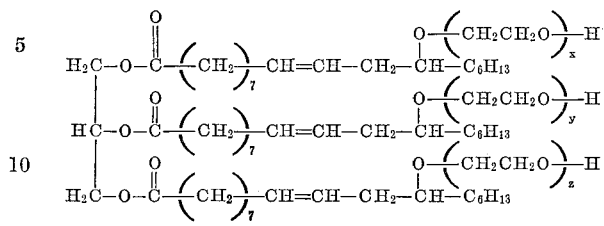

wherein $x$, $y$, and $z$ are integers as defined above. When the glyceryl triricinoleate is hydrogenated prior to polyethoxylation then the product of the polyethoxylation may be designated polyethoxylated hydrogenated caster oil, or polyethoxylated glyceryl tristearate and would have the structure:

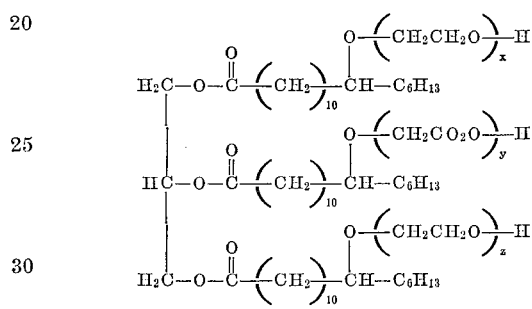

This compound is preferred due to its availability and to its ability to be purified to a high degree and thus the discoloration of the polycarbonamide to which it is added is extremely slight.

The amount of alkylene oxide attached to the triglyceride is important to the extent that it must be sufficient to allow for good dispersion in the polymer. It has been found that less than about 50 moles (i.e., about 2,000 M.W.) results in a poorly dispersed modifying agent. About 500 moles (i.e., about 22,000 M.W.) has been found to be the practical upper limit since it is very difficult to alkoxylate the triglyceride with higher molecular weight material.

The modified synthetic linear polyamides as described herein are prepared by procedures well known in the art and commonly employed in the manufacture of unmodified polyamides. That is, the reactants are heated at temperature of from 180° C. to 300° C., and preferably from 200° C. to 295° C. until the product has sufficiently high molecular weight to exhibit fiber-forming properties. This condition is reached when the polyamide has an intrinsic viscosity of at least 0.4 in accordance with the definition of intrinsic viscosity as given herein above. The reaction can be conducted at superatmospheric, atmospheric or subatmospheric pressure. Often it is desirable, especially in the last stage of the reaction, to employ conditions, e.g., reduced pressure, which will aid in the removal of the reaction by-product. Preferably, the reaction is carried out in the absence of oxygen, e.g., in an atmosphere of nitrogen.

For convenience, when a diamine and dicarboxylic acid are used in the preparation of a polyamide, it is usually desirable that the dicarboxylic acid be introduced into the reaction as a preformed salt, i.e., diamine salt. However, this is a matter of convenience only since the dicarboxylic acid and a corresponding molecular quantity of diamine may be in the form of uncombined diacid-diamine when brought into the reaction zone.

The synthetic linear polycarbonamides of this invention may be prepared, spun and drawn under conventional, polyamide-forming production conditions. In addition to the aforedescribed antistatic agents, delusterants, anti-oxidants, plasticizers, viscosity stabilizers, and other like materials may be used in the preparation of the polyamides of this invention.

According to the invention there is blended into the polycarbonamide-triglyceride system from 0.005 and 4.0 weight percent (based on the weight of the polymer) trialkyl phosphine oxides which are satisfied by the following general formula:

in which $R_1$, $R_2$ and $R_3$ are selected from the group consisting of straight chain alkyl groups containing from 4 to 18 carbon atoms and branched chain alkyl groups containing from 4 to 18 carbon atoms.

The trialkyl phosphine oxides are preferably melted and blended into the polyalkoxylated triglyceride, which is then blended into the molten polycarbonamide just prior to spinning. However, they can be added to the materials which will be reacted to form the polymer, or can be separately blended into the molten polymer before or after blending in the polyalkoxylated triglyceride.

EXAMPLE I

This example illustrates the preparation of filaments of the static resistant polyamide disclosed in the above-noted patent, namely, polyhexamethylene adipamide (nylon 66) polyblended with 200 molar polyethoxylated hydrogenated castor oil. These yarns will be used as a standard of comparison for strength retention properties with polyamides of the same type modified in accordance with this invention.

The following materials are added to a stainless steel high-pressure autoclave equipped with a mechanical stirrer: 150 grams of hexamethylene diammonium adipate (nylon-66 salt), 150 grams of water, 50 p.p.m. of manganese added in the form of manganous hypophosphite monohydrate salt (based on the weight of unmodified polyamide), and 13 grams of hydrogenated castor oil polyethoxylated with 200 moles of ethylene oxide per mole of the glyceride. The autoclave is then purged of air using purified nitrogen and, while stirring, the temperature in the autoclave is slowly raised until values of 190 to 200° C. are reached. At this point 2.6 grams of titanium dioxide is added. Next the temperature and pressure in the autoclave are raised until 220° C. at 250 p.s.i.g. pressure are reached. The temperature is then further increased while steam condensate is removed until the temperature reaches 243° C. At this point the pressure is slowly reduced over a 25-minute period to atmospheric pressure while the temperature of the molten polymer is raised to 278° C., at which point the polymer melt is allowed to equilibrate for 30 minutes.

The resultant molten polymer is melt extruded through a 13-hole spinneret to yield white multifilament yarn. The yarn is drawn 4.23 times its original length and has a tenacity of 4.07 grams per denier at an ultimate elongation of 34.6%. Resistance of this yarn to strength loss upon being exposed to light is shown in Table I.

EXAMPLE II

Polymer is prepared as in Example I above, except that 0.65 gram of tri(n-octyl) phosphine oxide is added to the polymer preparation ingredients. Since the Example I procedure produces approximately 130 grams of nylon-66 polymer matrix, the trialkyl phosphine oxide added in this example constitutes about 0.5 weight percent based on the weight of the polymer. The finished polymer is then melt spun through a 13-hole spinneret. The resulting yarn is drawn to 4.16 times its original length and has a tenacity of 3.83 grams per denier and an ultimate elongation at break of 25.3%.

EXAMPLE III

Polymer is prepared as in Example I above, except that 0.13 gram (about 0.01 weight percent) tri(n-octyl) phosphine oxide is added to the polymer preparation ingredients. This polymer is melt spun through a 13-hole spinneret. The resulting yarn is drawn 4.10 times its original length, and has a tenacity of 3.91 grams per denier and an ultimate elongation at break of 25.1%.

EXAMPLE IV

Polymer is prepared as in Example I above, except that 1.3 grams of tri(n-octyl) phosphine oxide is added to the polymer preparation ingredients. The polymer is melt spun through a 13-hole spinneret. The resulting yarn is drawn 4.47 times its original length, and has a tenacity of 5.26 grams per denier at an ultimate elongation of 22.7%.

EXAMPLE V

Polymer is prepared as in Example I above, except that 0.65 gram, tri(n-butyl) phosphine oxide is added to the polymer preparation ingredients. The polymer is melt spun through a 13-hole spinneret. The resulting yarn is drawn 4.40 times its original length, and has a tenacity of 5.15 grams per denier at an ultimate elongation of 20.1%.

EXAMPLE VI

Polymer is prepared as in Example I above, except that 0.65 grams tri(n-butyl) phosphine oxide is added to the polymer preparation ingredients. The polymer is melt spun through a 13-hole spinneret. The resulting yarn is drawn 4.00 times its original length, and has a tenacity of 5.6 grams per denier at an ultimate elongation of 30.0%.

EXAMPLE VII

Polymer is prepared as in Example I above, except that 0.65 gram tri(3-methyl-pentyl) phosphine oxide is added to the polymer preparation ingredients. The polymer is melt spun through a 13-hole spinneret. The resulting yarn is drawn 4.00 times its original length and has a tenacity of 5.49 grams per denier at an ultimate elongation of 32.0%.

EXAMPLE VIII

Polymer is prepared as in Example I above, except that 0.65 gram of tri(dodecyl)phosphine oxide is added to the polymer preparation ingredients. The polymer is melt spun through a 13-hole spinneret. The resulting yarn is drawn 4.12 times its original length, and has a tenacity of 5.45 grams per denier at an ultimate elongation of 32.8%.

EXAMPLE IX

Polymer is prepared as in Example I above, except that 0.65 gram of tri(octadecyl)phosphine oxide is added to the polymer preparation ingredients. The polymer is melt spun through a 13-hole spinneret. The resulting yarn is drawn 4.00 times its original length, and has a tenacity of 5.5 grams per denier at an ultimate elongation of 32.0%.

EXAMPLE X

This example illustrates the preparation of filaments of poly-ε-caproamide (nylon 6) polyblended with 200 molar polyethoxylated hydrogenated castor oil. These yarns are used as the standard of comparison for light stability properties with polyamides of the same type, modified in accordance with this invention.

The following materials are added to a stainless steel autoclave, equipped with a mechanical stirrer: 130 grams of ε-caprolactam, 5 grams of water, 10 p.p.m. (based on the weight of the nylon 6 polymer) of manganese added in the form of manganous hypophosphite-mono-hydrate salt, and 13 grams of 200 molar polyethoxylated hydrogenated castor oil (glyceride ester). The autoclave is then purged of air with purified nitrogen and with stirring the temperature in the autoclave slowly raised to 190–200° C. At this point 0.3 weight percent (based on the weight of unmodified polyamide) of titanium dioxide is added. The temperature and pressure in the autoclave are then raised to 243° C. and 250 p.s.i.g. with the removal of steam condensate. While the melt temperature continues to increase to maximum 280° C. over a 25-minute period, the pressure is gradually reduced to atmospheric pressure. The polymer melt is then allowed to equilibrate in the molten state for 30 minutes, during which time the temperature is lowered to 240° C.

The finished molten polymer is then melt spun through 13-hole spinnerets to yield white yarn. The yarn is then drawn 4.00 times its original length having a tenacity of 5.5 grams per denier at ultimate elongation of 30.0%.

EXAMPLE XI

This polymer is prepared under the same procedure and conditions as described in Example IV except that 0.65 grams of tri-octyl-phosphine oxide is added to the polymer preparation ingredients. The finished polymer is then melt spun through a 13-hole spinneret to yield white yarn. The yarn is subsequently drawn 4.00 times its original length having a tenacity of 5.4 grams per denier at an ultimate elongation of 33.0%.

To test resistance to light degradation, each yarn in the above examples is individually twisted to a level of 10 turns per inch on a conventional ring twister, and then heat-relaxed as disclosed in U.S. Pat. No. 2,199,411, to avoid building up of tension during the subsequent exposure to light. Each yarn is then wound on white cardboard. All yarns are then exposed simultaneously in the same apparatus to radiation from a carbon-arc lamp according to AATCC Standard Test Method 16A–1964, for the various periods specified in the table below.

The tenacities and ultimate or breaking elongations referred to herein are determined by ASTM test method D–2556, using a constant rate of elongation testing machine as set forth therein. Resistance to light degradation is determined by measuring the yarn tenacity (breaking strength) before and after exposure of the yarns to radiation. In the table, the results are expressed as the percentage of original tenacity retained after exposure, i.e., the tenacity after a specified exposure divided by the tenacity of the same yarn before exposure.

TABLE I

| Example | Percent yarn strength retained after— | | | |
|---|---|---|---|---|
| | 20 hrs. | 40 hrs. | 80 hrs. | 100 hrs. |
| I (control) | 80.5 | 65.2 | 38.9 | 31.8 |
| II (test) | 83.2 | 74.0 | 60.8 | 52.0 |
| III (test) | 80.6 | 67.1 | 40.2 | 34.0 |
| IV (test) | 83.2 | 75.1 | 65.5 | 59.2 |
| V (test) | 83.1 | 77.3 | 69.2 | 63.4 |
| VI (test) | 82.1 | 70.2 | 40.4 | 35.0 |
| VII (test) | 84.4 | 76.2 | 63.1 | 53.5 |
| VIII (test) | 80.1 | 68.7 | 60.4 | 50.7 |
| IX (test) | 78.5 | 66.1 | 55.3 | 48.9 |
| X (control) | 75.0 | 55.5 | 42.0 | 33.5 |
| XI (test) | 76.0 | 70.4 | 62.0 | 53.5 |

A comparison of Examples II to IV shows that the effectiveness of adding a given amount of tri-alkyl-phosphine oxide is greatest at low concentrations. When the amount of tri(n-octyl) phosphine oxide in Example V is doubled, the percentage yarn tenacity retentions after 40 and 100 hours exposure to the carbon-arc lamp are increased to only 80.1 and 67 percent, respectively. Four percent of the weight of the polymer is therefore a reasonable upper effective limit, with between 0.1 and 1.0 percent being the preferred level of trialkyl phosphine oxide concentration.

What we claim is:

1. A composition comprising a fiber-forming synthetic linear polycarbonamide selected from the group consisting of the polymeric condensation product of at least one dicarboxylic acid or the amide-forming derivative thereof and at least one diamine or the amide-forming derivative thereof and the polymeric condensation product of at least one aminoacid or the amide-forming derivative thereof, said composition further containing, based on the weight of the polycarbonamide:

(A) from 0.1 to about 20.0 weight percent polyalkoxylated triglyceride of a saturated fatty acid having 10 to 30 carbon atoms, wherein the polyalkoxy portion has a molecular weight of between about 2,000 and 22,000; and (B) from 0.005 to 4.0 percent tri-alkyl phosphine oxide having the general formula

wherein $R_1$, $R_2$, and $R_3$ are selected from the group consisting of straight chain alkyl groups containing from 4 to 18 carbon atoms, and branched chain alkyl groups containing from 4 to 18 carbon atoms.

2. The composition defined in claim 1, wherein said polycarbonamide is polyhexamethylene adipamide.

3. The composition defined in claim 1, wherein said trialkyl phosphine oxide is present in an amount between 0.1 and 1.0 weight percent, based on the weight of said polycarbonamide.

4. A textile fiber formed from the composition defined in claim 1.

References Cited

UNITED STATES PATENTS

| 2,493,597 | 1/1950 | Rothrock et al. | 260—45.7 |
| 2,510,777 | 6/1950 | Gray | 260—45.7 |
| 2,705,227 | 3/1955 | Stamatoff | 260—45.7 |
| 2,984,647 | 5/1961 | White | 260—45.75 |
| 2,985,621 | 5/1961 | Wiesbaden et al. | 260—45.75 |
| 3,108,091 | 10/1963 | Illing et al. | 260—45.75 |
| 3,180,849 | 4/1965 | Thompson | 260—45.7 |
| 3,228,898 | 1/1966 | Illing et al. | 260—18 |
| 3,388,104 | 6/1968 | Crovatt | 260—78 |
| 3,428,597 | 2/1969 | Dikotter et al. | 260—45.75 |

DONALD E. CZAJA, Primary Examiner

E. C. RZUCIDLO, Assistant Examiner

U.S. Cl. X.R.

260—45.7